Jan. 13, 1925.
D. J. CHAPPELL
1,522,805
PNEUMATIC TIRE TUBE
Filed Sept. 2, 1924
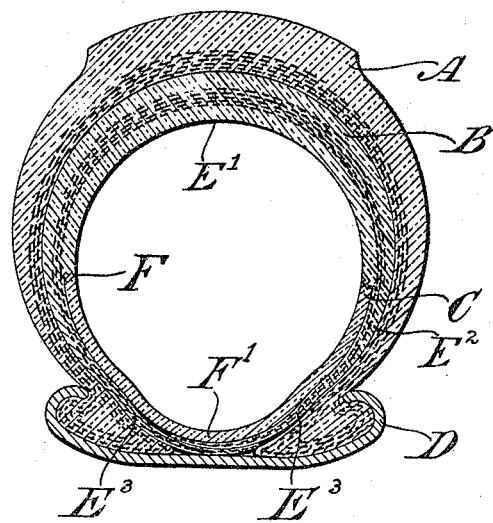
Inventor
David John Chappell
Per
David Rines Atty.

Patented Jan. 13, 1925.

1,522,805

UNITED STATES PATENT OFFICE.

DAVID JOHN CHAPPELL, OF LLANELLY, WALES.

PNEUMATIC-TIRE TUBE.

Application filed September 2, 1924. Serial No. 735,288.

*To all whom it may concern:*

Be it known that I, DAVID JOHN CHAPPELL, of 52 College Hill, Llanelly, in the county of Carmarthen, South Wales, a subject of the King of Great Britain and Ireland, have invented a new Pneumatic-Tire Tube (for which I have filed application in Great Britain No. 15176 filed the 11th June, 1923), of which the following is a specification.

The present invention relates to a pneumatic tire tube and seeks to provide a tube for pneumatic tires of vehicle wheels which firstly, combines the properties of an elastic tube with an inelastic liner between tube and cover, secondly, overcomes the difficulties due to friction in existing arrangements, and thirdly permits of easy fitting and immunity from accidental misfitting of the tube with consequent nips and bursts.

The present invention consists in the combination with a tube of conventional type, of an inelastic liner of canvas and rubber or like manufacture vulcanized thereto so as to enclose the tube almost entirely, leaving an unvulcanized portion next the rim which is protected by overlapping free edges of the liner. The accompanying section of assembled tube, liner, outer cover, and rim illustrates the invention. The normally elastic tube C of usual form is enclosed by a liner B which is inelastic, being composed of any well known material preferably of layers of rubbered canvas moulded or vulcanized together in known manner. Old outer covers may be adapted for use by cutting off superfluous rubber, and beads or wired edges. The liner B is thicker in the vicinity of the tread, at $E^1$, and tapers down the walls at $E^2$. Part of the tube C at F is not vulcanized to the liner and therefore remains elastic and stretchable. The free edges $E^3$ of the liner B overlap this elastic portion in the manner shown thus protecting the non-durable tube from the rim D to which the combined liner and tube is fitted within the usual cover A. The free edges $E^3$ may comprise single layers of rubbered canvas such as is often used to hold gaiters in position within a cover, since they are not required to resist severe mechanical strains. The tube is of course inflated in the usual way provision being made for the accommodation of the valve in the edges $E^3$.

I claim:—

A device of the class described having, in combination, an annular tube constituted of elastic material, and an inelastic liner integrally secured to the tube along the outer circumference of the tube and having free margins extending beyond the integrally secured portions, said free margins being adapted to be overlapped against the inner circumference of the tube.

In witness whereof I have signed this specification.

DAVID JOHN CHAPPELL.